United States Patent
Hettich et al.

[11] Patent Number: 6,109,621
[45] Date of Patent: Aug. 29, 2000

[54] WHEEL CARRIER FOR AN INDEPENDENT WHEEL SUSPENSION

[75] Inventors: Ralph Hettich, Kernen; Guenter Hoelzel, Hochdorf, both of Germany

[73] Assignee: DaimlerChrysler AG, Stuttgart, Germany

[21] Appl. No.: 09/148,985

[22] Filed: Sep. 8, 1998

[30] Foreign Application Priority Data

Sep. 5, 1997 [DE] Germany .................. 197 38 835

[51] Int. Cl.[7] .................................................. B62B 5/02
[52] U.S. Cl. ........................ 280/5.52; 280/124.103; 280/124.125; 280/93.51; 280/93.52; 280/156; 280/157
[58] Field of Search ...................... 280/93.51, 93.512, 280/124.103, 124.125, 5.521, 5.52, 156, 157; 293/12, 13, 42, 58

[56] References Cited

U.S. PATENT DOCUMENTS

| | | | |
|---|---|---|---|
| 1,625,824 | 4/1927 | Ratcliff | 293/58 |
| 4,632,413 | 12/1986 | Fujita | 280/93.51 |
| 5,022,673 | 6/1991 | Kekino | 280/93.512 |
| 5,257,801 | 11/1993 | Matsuzawa | 280/93.512 |
| 5,292,149 | 3/1994 | Luger | 280/5.521 |

FOREIGN PATENT DOCUMENTS

| | | |
|---|---|---|
| 0 827 895 A1 | of 0000 | European Pat. Off. . |
| 0161500 | 11/1985 | European Pat. Off. . |
| 0411262 | 2/1991 | European Pat. Off. . |
| 2486899 | 1/1982 | France . |
| 196 08 578 A1 | of 0000 | Germany . |
| 39 18 387 A1 | of 0000 | Germany . |
| 44 44 115 A1 | of 0000 | Germany . |
| 1052834 | 2/1959 | Germany . |
| 1979502 | 11/1967 | Germany . |
| 3401631 | 7/1985 | Germany . |
| 466448 | of 0000 | United Kingdom . |
| 2155410 | 9/1985 | United Kingdom . |

*Primary Examiner*—Lanna Mai
*Assistant Examiner*—Toan To
*Attorney, Agent, or Firm*—Evenson, McKeown, Edwards & Lenahan, P.L.L.C.

[57] ABSTRACT

A wheel carrier for an independent wheel suspension of a motor vehicle tilts particularly during cornering. The tilt is transmitted to the wheel carrier by suspension links in the sense of a tilting tendency in the same direction. An additional function is obtained for the wheel carrier by lengthening the wheel carrier in the upward direction beyond the linking point of the uppermost suspension link and providing the wheel carrier with fastening points for a fender sectionally surrounding an assigned wheel.

1 Claim, 1 Drawing Sheet

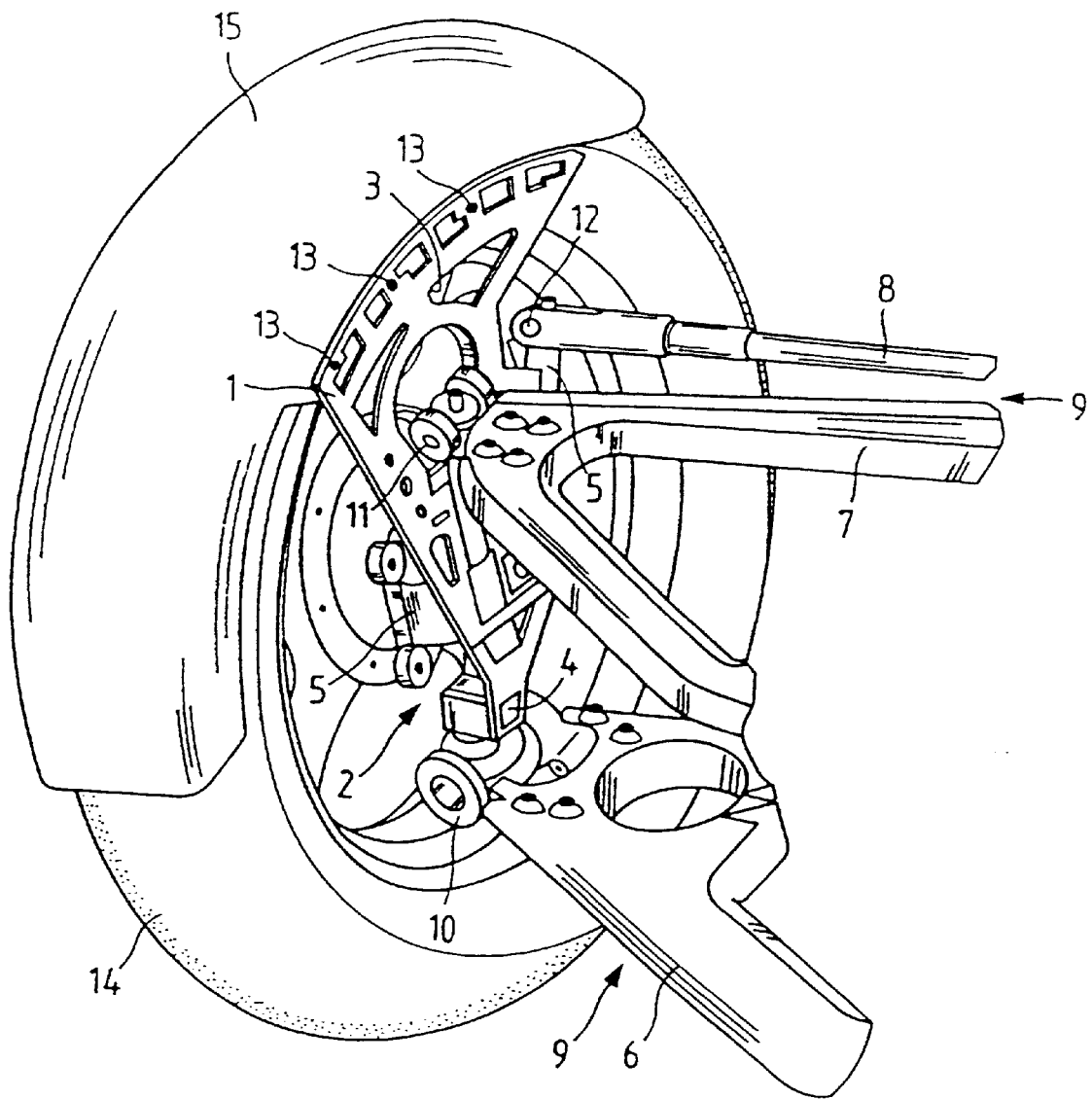

WHEEL CARRIER FOR AN INDEPENDENT WHEEL SUSPENSION

BACKGROUND OF THE INVENTION

This application claims the priority of German application No. 197 38 835.3, filed Sep. 5, 1997, the disclosure of which is expressly incorporated by reference herein.

The present invention relates to a wheel carrier for an independent wheel suspension of a vehicle, particularly of a motor vehicle which tilts during cornering, the tilt of which is transmitted to the wheel carrier by suspension links in the sense of a tilting tendency in the same direction.

A tiltable wheel carrier is described in German Patent Application 196 08 578.0-21.

SUMMARY OF THE INVENTION

An object of the present invention to further improve the wheel carrier such that, in addition to its wheel and control arm linking function, it can take over another receiving function.

This object is achieved by a wheel carrier which is lengthened beyond the linking point of the uppermost suspension link in the upward direction and has fastening points for a fender sectionally surrounding an assigned wheel. In vehicles with separate fenders, an especially shaped fender holder, which is to be arranged between the wheel carrier and the fender, can generally be eliminated in this manner.

BRIEF DESCRIPTION OF THE DRAWING

Other objects, advantages and novel features of the present invention will become apparent from the following detailed description of the invention when considered in conjunction with the sole FIGURE wherein:

A perspective view of a wheel carrier according to the present invention is shown looking from the suspension links toward the inside of a tire.

DETAILED DESCRIPTION OF THE DRAWING

For reducing weight, a steel plate base part 1 of a wheel carrier 2 has several perforations 3, 4. A number of these perforations 3, 4 house elements 5 for receiving wheels, control arms and brakes. In the lower area of the wheel carrier 2, a first control arm 6 is pivotally connected and, in the upper area, a second control arm 7 and a tie rod 8 are pivotally connected. The control arms 6, 7 as well as the tie rod 8 represent suspension links 9 which are connected with the wheel carrier by linking points 10, 11, 12.

The base part 1 of the wheel carrier 2 is lengthened beyond the linking point 11, 12 of the uppermost suspension link 9 in the upward direction and houses fastening points 13 for a fender 15 which surrounds an assigned wheel 14 by way of a certain section. The fender 15 can therefore easily follow the cornering-caused aligning movements of the wheel 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wheel carrier for an independent wheel suspension of a vehicle which tilts during cornering, comprising suspension links configured to transmit tilt in the sense of a tilting tendency in the same direction, an uppermost one of the suspension links having a linking point beyond which a portion of the wheel carrier is lengthened in an upward direction, and fastening points on the lengthened portion of the wheel carrier for a fender sectionally surrounding a wheel associated with the wheel carrier.

\* \* \* \* \*